(12) United States Patent
Kwon (10) Patent No.: US 7,347,611 B2
(45) Date of Patent: Mar. 25, 2008

(54) OPTICAL GUIDE AND IMAGE FORMING APPARATUS USING THE SAME

(75) Inventor: Tae-eun Kwon, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 18 days.

(21) Appl. No.: 10/629,851

(22) Filed: Jul. 30, 2003

(65) Prior Publication Data

US 2004/0071436 A1 Apr. 15, 2004

(30) Foreign Application Priority Data

Aug. 7, 2002 (KR) .................. 10-2002-0046561

(51) Int. Cl.
*F21V 7/04* (2006.01)
*G03B 27/54* (2006.01)

(52) U.S. Cl. .................. 362/625; 362/602; 355/67

(58) Field of Classification Search ............ 362/31, 362/555, 330, 339, 26, 615, 610, 616, 623, 362/625, 626, 558, 602; 355/67; 385/116
See application file for complete search history.

(56) References Cited

U.S. PATENT DOCUMENTS

| | | | | |
|---|---|---|---|---|
| 3,535,018 A | * | 10/1970 | Vasilatos | ............ 362/556 |
| 4,432,039 A | * | 2/1984 | Cibie | ............ 362/551 |
| 4,585,298 A | * | 4/1986 | Mori | ............ 362/551 |
| 4,936,663 A | * | 6/1990 | Mori | ............ 362/557 |
| 5,584,556 A | * | 12/1996 | Yokoyama et al. | ......... 362/625 |
| 5,664,862 A | * | 9/1997 | Redmond et al. | ............ 362/625 |
| 5,850,585 A | * | 12/1998 | Tsutsumi et al. | ............ 399/128 |
| 5,857,761 A | * | 1/1999 | Abe et al. | ............ 362/551 |
| 5,915,855 A | * | 6/1999 | Murase et al. | ............ 362/611 |
| 6,088,074 A | * | 7/2000 | Suzuki | ............ 349/62 |
| 6,341,872 B1 | * | 1/2002 | Goto | ............ 362/623 |

(Continued)

FOREIGN PATENT DOCUMENTS

CN 1183567 6/1998

(Continued)

OTHER PUBLICATIONS

Notice to Submit response (from Korean Patent Office), dated Mar. 30, 2004.

(Continued)

*Primary Examiner*—Alan Cariaso
(74) *Attorney, Agent, or Firm*—Staas & Halsey LLP (57) ABSTRACT

An optical guide and an image forming apparatus which uses the optical guide in an eraser or an auxiliary transfer device. The optical guide guides light incident through one side in a lengthwise direction, makes the light in an effective width range of the lengthwise direction uniform and outputs the light. The optical guide includes a first surface on which a plurality of reflective slopes each having a stripe shape and forming a predetermined angle with respect to the lengthwise direction are discretely formed. Either an angle formed between the slopes and the lengthwise direction or an interval between the reflective slopes is varied. The optical guide further includes a second surface which is opposite to the first surface and is used as an output surface from which light reflected from the reflective slopes is output.

2 Claims, 7 Drawing Sheets

U.S. PATENT DOCUMENTS 6,601,984 B2 * 8/2003 Yamamoto et al. ......... 362/600
6,607,297 B2 * 8/2003 Egawa ....................... 362/558
6,738,588 B2 * 5/2004 Yokomori et al. .......... 399/111

FOREIGN PATENT DOCUMENTS

| JP | 4-42663 | 4/1992 |
| JP | 7-294914 | 11/1995 |
| JP | 10-123897 | 5/1998 |
| JP | 2001-142365 | 5/2001 |
| JP | 2002-8423 | 1/2002 |
| JP | 2002-131553 | 5/2002 |

OTHER PUBLICATIONS

Office Action Issued by Chinese Patent Office dated Dec. 24, 2004.

* cited by examiner

OPTICAL GUIDE AND IMAGE FORMING APPARATUS USING THE SAME

CROSS-REFERENCE TO RELATED APPLICATIONS

This application claims the priority of Korean Patent Application No. 2002-46561, filed Aug. 7, 2002 in the Korean Intellectual Property Office, the disclosure of which is incorporated herein by reference.

BACKGROUND OF THE INVENTION

1. Field of the Invention

The present invention relates to an optical guide and an image forming apparatus which uses the optical guide in an eraser or an auxiliary transfer device.

2. Description of the Related Art

Figure 1:
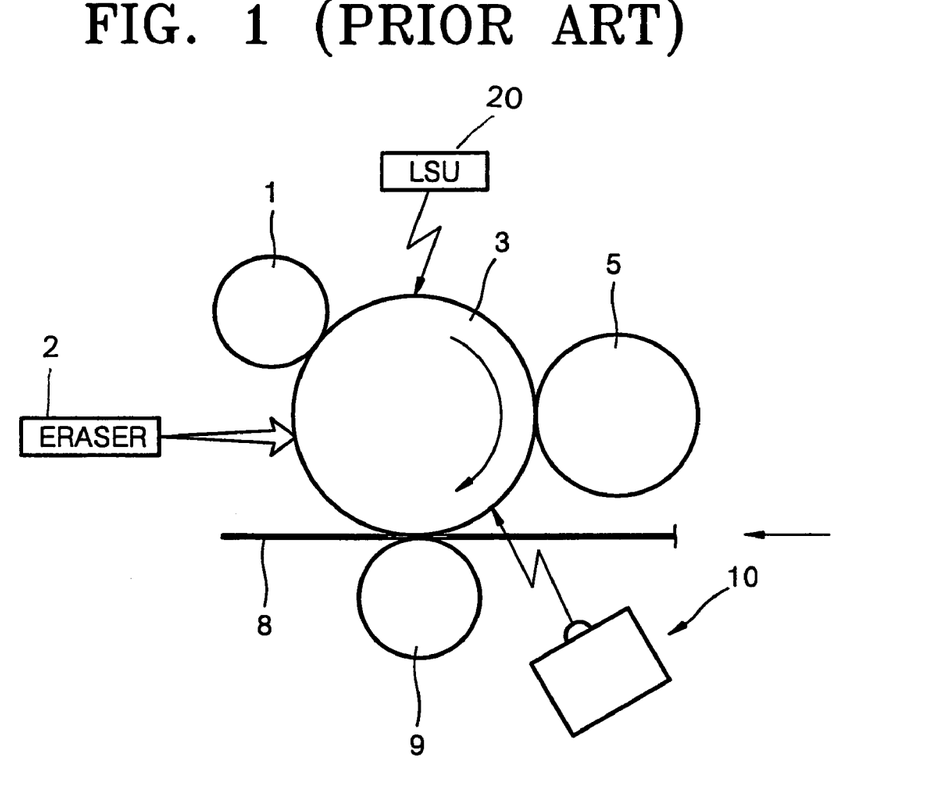
FIG. 1 schematically shows an example of a conventional image forming apparatus.

FIG. 1 schematically shows an example of a related image forming apparatus. The conventional image forming apparatus includes a charger including a charging roller 1, a laser scanning unit (LSU) 20, and a photoreceptor drum 3 as a photosensitive medium. The conventional apparatus further includes a developing unit including a developing roller 5, a transfer unit including a transfer roller 9, and an auxiliary transfer device 10 which increases the surface potential of the photoreceptor drum 3 by radiating light on the surface of the photoreceptor drum 3 so that a transfer efficiency of a toner image is improved. Also, the image forming apparatus further includes an eraser 2 which initializes the surface potential of the photoreceptor drum 3. Here, the auxiliary transfer device 10 may include a transfer belt instead of the transfer roller 9.

In the image forming apparatus having the above structure, the toner image is formed on the surface of the photoreceptor drum 3 and transferred onto a paper 8 as described below.

The surface of the photoreceptor drum 3 is charged by the charging roller 1 to a predetermined voltage and has a predetermined negative surface potential. Thus, when a laser beam is irradiated by the laser scanning unit (LSU) 20 on a portion where the toner image on the surface of the photoreceptor drum 3 is to be formed, the surface potential of the photoreceptor drum 3 in the portion on which the laser beam is irradiated varies, and thus, an electrostatic latent image is formed. When the electrostatic latent image is developed by the developing roller 5, toner is attached to the electrostatic latent image, and thus, the toner image is formed. The toner image formed on the surface of the photoreceptor drum 3 is transferred by the transfer roller 9 to the paper 8.

In the image forming apparatus, for example, a DC voltage of about −1400V is applied to the charging roller 1, and a DC voltage of about −200V is applied to the photoreceptor drum 3 such that the surface of the photoreceptor drum 3 is charged and the surface potential of the photoreceptor drum 3 is set to about −800V. In addition, an exposure potential by the LSU 20 (i.e., the surface potential of the photoreceptor drum 3 in the portion on which the laser beam is irradiated by the LSU, which corresponds to the potential of the electrostatic latent image) is set to −50V, and the surface of the developing roller 5 is charged to about −300V. Thus, toner from the developing roller 5 is attached to the electrostatic latent image having the exposure potential. In addition, the transfer roller 9 is charged to +1200V such that the toner image on the surface of the photoreceptor drum 3 is transferred to the paper 8.

The auxiliary transfer device 10, which is a so-called pre-transfer lamp (PTL), improves an efficiency with which the toner is transferred from the surface of the photoreceptor drum 3 on the paper 8 and is installed between the developing roller 5 and the transfer roller 9. The auxiliary transfer device 10 is turned on at a specific time and light is irradiated on the surface of the photoreceptor drum 3 so that the charging potential of the surface of the photoreceptor drum 3 is reduced by half. For example, the charging potential is reduced to about −400V, such that a difference between the exposure potential by the laser beam irradiated by the LSU 20 and the surface potential of the surface of the photoreceptor drum 3 around the exposure potential is decreased. As such, the toner attached to a position corresponding to the exposure potential of the surface of the photoreceptor drum 3 is easily transferred. Thus, the toner on the surface of the photoreceptor drum 3 can be easily transferred even at a low transfer voltage. In this case, since the toner is attached to the position of the exposure potential, light emitted from the auxiliary transfer device 10 is not irradiated on the position of the exposure potential, and thus, the exposure potential is not changed.

The auxiliary transfer device 10 is provided to radiate light having a wavelength analogous to that of the laser beam emitted from the LSU 20, for example, having a wavelength of about 600-800 nm.

Figure 2:
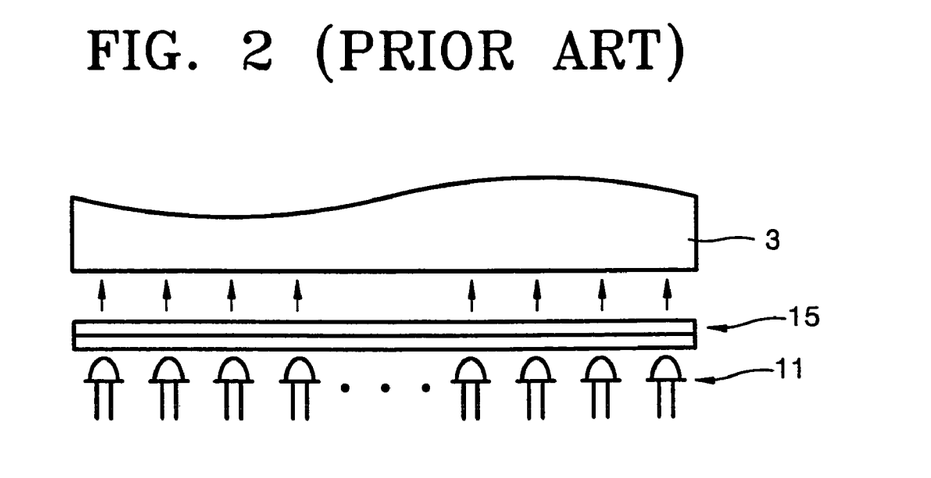
FIG. 2 shows a conventional auxiliary transfer device for an image forming apparatus.

FIG. 2 schematically shows a conventional auxiliary transfer device for an image forming apparatus. Referring to FIG. 2, the auxiliary transfer device for a conventional image forming apparatus includes a light emitting diode (LED) array 11 and a lens 15 which causes light output from the LED array 11 to condense on a photoreceptor drum 3.

The LED array 11 includes twelve to eighteen LEDs that are arranged in a row in a lengthwise direction of the photoreceptor drum 3 to uniformly irradiate light on an entire surface of the photoreceptor drum 3 in the lengthwise direction, i.e., a main scanning direction of the photoreceptor drum 3.

However, round-type LEDs of the same specification might differ in brightness by as much as 30%. Thus, when the LED array 11 in which the twelve to eighteen LEDs are arranged in a row is used as described above, unless LEDs outputting the same amount of light are sorted and applied, a difference in the amount of output light for the LEDs is large, and thus, a print image concentration becomes non-uniform.

That is, transfer failure occurs in a portion on which light is irradiated from an LED having a very small amount of output light, and a concentration difference of block color occurs in a fine image in a portion on which light is irradiated from an LED having a very large amount of output light, and thus, printing quality is lowered. The concentration difference of block color occurs when the amount of irradiated light is strong, since a difference between the exposure potential and the charging potential is decreased so that the toners are not concentrated on the position of the exposure potential and are scattered around printed dots. As a result, the dots appear too large and thus are darker in a gray image.

SUMMARY OF THE INVENTION

Accordingly, it is an aspect of the present invention to provide an optical guide in which light incident through one side is guided in a lengthwise direction and light having a uniform intensity is output in the lengthwise direction, and an image forming apparatus using the optical guide in an eraser or an auxiliary transfer device so that light having a uniform intensity is irradiated on the surface of a photoreceptor medium.

Additional aspects and advantages of the invention will be set forth in part in the description which follows and, in part, will be obvious from the description, or may be learned by practice of the invention.

The foregoing and/or other aspects of the present invention are achieved by providing an optical guide which guides light incident therethrough in a lengthwise direction, makes uniform the light in an effective width range of the lengthwise direction and outputs the uniform light, the optical guide comprising a first surface to receive the incident light, comprising a plurality of reflective slopes to reflect and make uniform the incident light, each of the reflective slopes having a stripe shape and forming a varying angle with respect to the lengthwise direction; and a second surface, which is opposite to the first surface and is an output surface from which the light reflected from the reflective slopes is output.

The reflective slopes are formed so that an interval therebetween varies. The interval between the reflective slopes gradually becomes narrower when moving further from a side onto which light is incident. The angle formed by the reflective slopes with respect to the lengthwise direction gradually becomes greater when moving further from the side onto which light is incident.

The reflective slopes are formed to have a width that gradually becomes greater when moving closer to the side onto which light is incident and gradually becomes smaller when moving further from the side onto which light is incident.

The foregoing and/or other aspects of the present invention may also be achieved by providing an optical guide which guides light incident therethrough in a lengthwise direction, makes uniform the light in an effective width range of the lengthwise direction and outputs the uniform light, the optical guide comprising a first surface to receive the incident light comprising a plurality of reflective slopes to reflect and make uniform the incident light, each of the reflective slopes having a stripe shape and forming a varying angle with respect to the lengthwise direction, an interval between the reflective slopes being varied; and a second surface, which is opposite to the first surface and is an output surface from which the light reflected from the reflective slopes is output.

The plurality of reflective slopes are parallel to one another and have a uniform width. The reflective slopes are obtained by forming a groove having a triangular structure on the first surface to have a striped shape.

A slope which connects the reflective slopes to a portion along the lengthwise direction of the second surface has a width greater than the width of the reflective slopes, and forms a gentle incline.

The foregoing and/or other aspects of the present invention may also be achieved by providing an image forming apparatus comprising an eraser which initializes a surface potential of a photoreceptor medium, and an auxiliary transfer device, which facilitates transfer of a toner image by radiating light on a surface of the photoreceptor medium light source; and an optical guide on a side of the apparatus having the light source, which guides light emitted from the light source and incident therethrough in a lengthwise direction, makes uniform the light in an effective width range of the lengthwise direction and outputs the uniform light, wherein the optical guide includes a first surface to receive the incident light comprising a plurality of reflective slopes to reflect and make uniform the incident light, each having a stripe shape and forming a varying angle with respect to the lengthwise direction, and a second surface which is opposite to the first surface and is an output surface from which the light reflected from the reflective slopes is output.

The foregoing and/or other aspects of the present invention may also be achieved by providing an image forming apparatus comprising an eraser which initializes a surface potential of a photoreceptor medium, and an auxiliary transfer device, which facilitates transfer of a toner image by radiating light on a surface of the photoreceptor medium, wherein the eraser and the auxiliary transfer device each include a light source; and an optical guide on a side of the apparatus having the light source, which guides light emitted from the light source and incident therethrough in a lengthwise direction, makes uniform the light in an effective width range of the lengthwise direction uniform and outputs the uniform light, wherein the optical guide includes a first surface to receive the incident light comprising a plurality of reflective slopes to reflect and make uniform the incident light, each having a stripe shape and forming a varying angle with respect to the lengthwise direction, and a second surface which is opposite to the first surface and is an output surface from which the light reflected from the reflective slopes is output.

BRIEF DESCRIPTION OF THE DRAWINGS

These and other aspects and/or advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

An optical guide according to the present invention may be used for either an eraser (40 of FIG. 3) or an auxiliary transfer device (50 of FIG. 3) or both the eraser 40 and the auxiliary transfer device 50 for an image forming apparatus. Hereinafter, an example in which the optical guide according to the embodiments of the present invention is used for the auxiliary transfer device 50 will be described.

Figure 3:
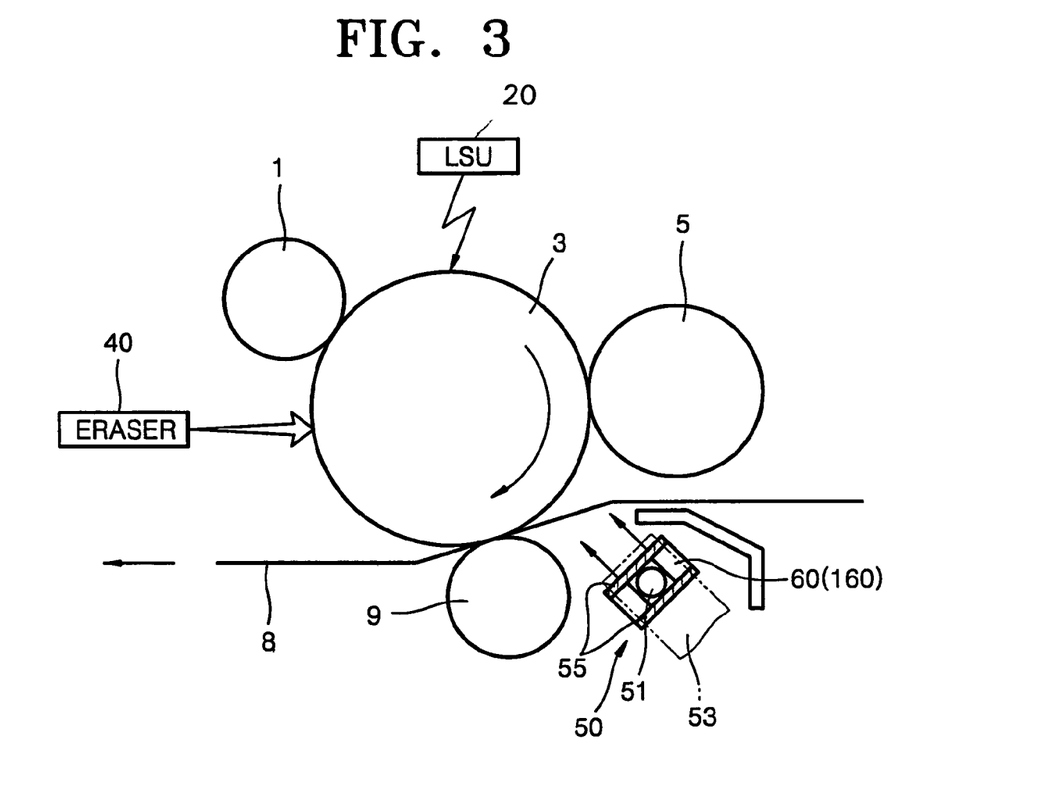
FIG. 3 shows an image forming apparatus which uses an optical guide according to embodiments of the present invention for an auxiliary transfer device.

FIG. 3 shows an image forming apparatus which uses an optical guide 60 (first embodiment) or 160 (second embodiment) according to the present invention for an auxiliary transfer device. In FIG. 3, the same reference numerals as those of FIG. 1 represent elements having similar functions, and thus, descriptions thereof will be omitted. In FIG. 3, an image forming apparatus employs the photoreceptor drum 3 as a photoreceptor medium. However, this is only an example, and thus, the image forming apparatus may employ different photoreceptor media, for example, a photoreceptor belt. In addition, the structure of the image forming apparatus is not limited to the structures of FIGS. 1 and 3 and may be modified in many ways.

In the present image forming apparatus, the auxiliary transfer device 50 is arranged, for example, between the developing roller 5 of a developing unit and the transfer roller 9 of a transfer unit, in order to radiate light on the surface of the photoreceptor drum 3, so that before a toner image formed on the surface of the photoreceptor drum 3 is transferred, light is irradiated on the surface of the photoreceptor drum 3 on which the toner image is formed and a transfer can be easily performed.

FIG. 3 shows an arrangement example in which the auxiliary transfer device 50 radiates light through the paper 8 on the surface of the photoreceptor drum 3. When there is space for the installation of the auxiliary transfer device 50, the auxiliary transfer device 50 may be installed so that light radiated on the surface of the photoreceptor drum 3 does not necessarily pass through the paper 8.

Referring to FIG. 3, in the image forming apparatus according to the embodiments of the present invention, the auxiliary transfer device 50 uses a lateral light emitting body in which only one light emitting diode (LED) 51 as a light source is installed on a print circuit substrate 53 which is as small as possible. The auxiliary transfer device 50 includes the transparent optical guide 60 or 160 which transfers light emitted from the LED 51 to the photoreceptor medium, such as the photoreceptor drum 3, with a predetermined angle and intensity of light.

Figure 4:
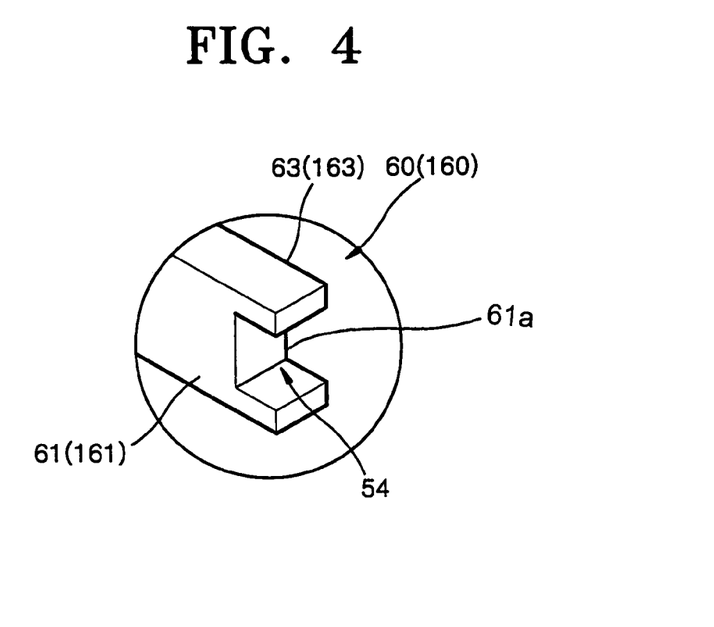
FIG. 4 is a perspective view showing the optical guide of FIG. 3.
Figure 5:
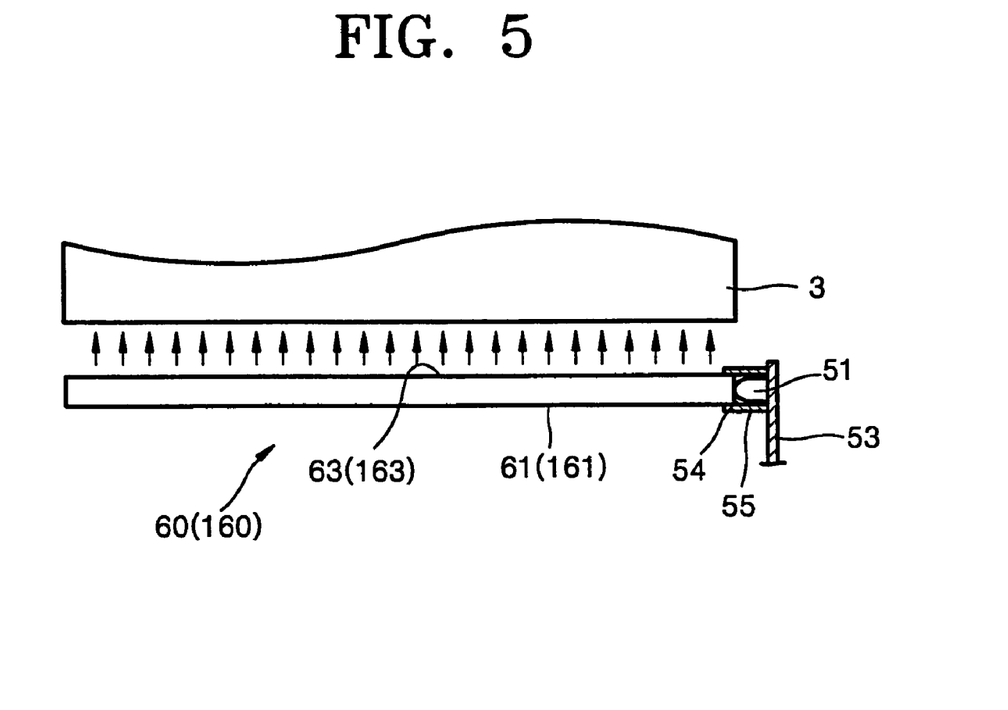
FIG. 5 shows an auxiliary transfer device according to the embodiments of the present invention.
Figure 6:
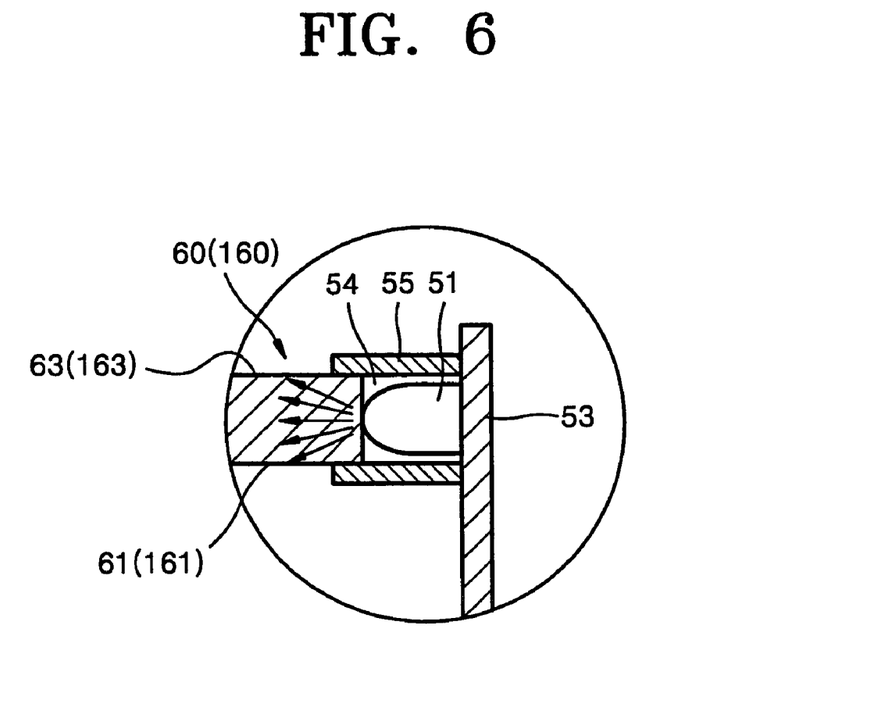
FIG. 6 is an enlarged view showing a portion in which a light source is installed in FIG. 5.
Figure 7:
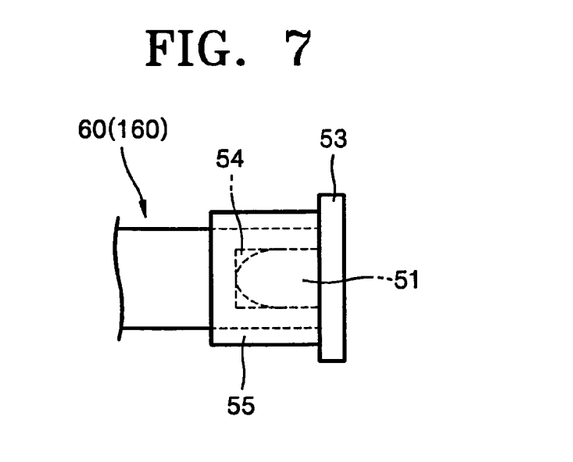
FIG. 7 is an enlarged plane view showing the portion in which the light source is installed in FIG. 5.

FIG. 4 is a perspective view showing a side portion of the optical guide 60 or 160 according to the embodiments of the present invention, and FIG. 5 shows the auxiliary transfer device 50 according to the embodiments of the present invention. FIG. 6 is an enlarged view showing a portion in which a light source is installed in FIG. 5, and FIG. 7 is an enlarged plane view showing the portion in which a light source is installed in FIG. 6.

As shown in FIG. 4, an installation groove 54 is made in a side of the optical guide 60 or 160, in which the LED 51 can be fixed.

A round-type LED may be used as the LED 51. In this case, a high power LED is used as the LED 51 so that light having high intensity as compared to the conventional LED array is output from the auxiliary transfer device 50.

Meanwhile, when the round-type LED 51 is used as the lateral light emitting body as described previously, the installation groove 54 is formed to accommodate a round part of the LED 51 such that the amount of light incident onto the optical guide 60 or 160 is maximized. In this case, the installation groove 54, as shown in FIG. 4, is formed to have a vertical section such that the round part of the LED 51 contacts the vertical section of the installation groove 54. Alternatively, the installation groove 54 may be formed to have a round section which corresponds to the round part of the LED 51.

As shown in FIG. 4, the installation groove 54 may be formed in a structure in which, by considering an interval between a first surface 61 or 161 and a second surface 63 or 163 which will be described later, that is, the thickness of the optical guide 60 or 160, the first surface 61 or 161 and the second surface 63 or 163 are opened on one side in a lengthwise direction of the optical guide 60 or 160. Here, the first surface 61 or 161 is a surface on which a plurality of discrete reflective slopes are formed. Also, the second surface 63 or 163 is a surface on which light reflected from the plurality of discrete reflective slopes is output from the optical guide 60 or 160.

When the installation groove 54 is formed to have both opened sides, as shown in FIGS. 5 through 7, the auxiliary transfer device 50 further includes a cover 55, which is a black cover, which prevents light emitted from the LED 51 from scattering, determines the position of the LED 51 with respect to the optical guide 60 or 160, and closely positions the LED 51 to the optical guide 60 or 160 such that a light amount error caused by a variation in a distance between the LED 51 and the optical guide 60 or 160 is minimized.

The optical guide 60 or 160 guides light incident through one side in a lengthwise direction, makes the light in an effective width range in the lengthwise direction uniform, and then outputs the light so that light emitted from the LED 51 arranged on one side 61a with respect to the lengthwise direction and incident onto the optical guide 60 or 160 is uniformly irradiated on the surface of the photoreceptor drum 3. Here, when the image forming apparatus prints a toner image on A4 size paper, the effective width range along the lengthwise direction of the optical guide 60 or 160 corresponds to the width of the A4 size.

Figure 8:
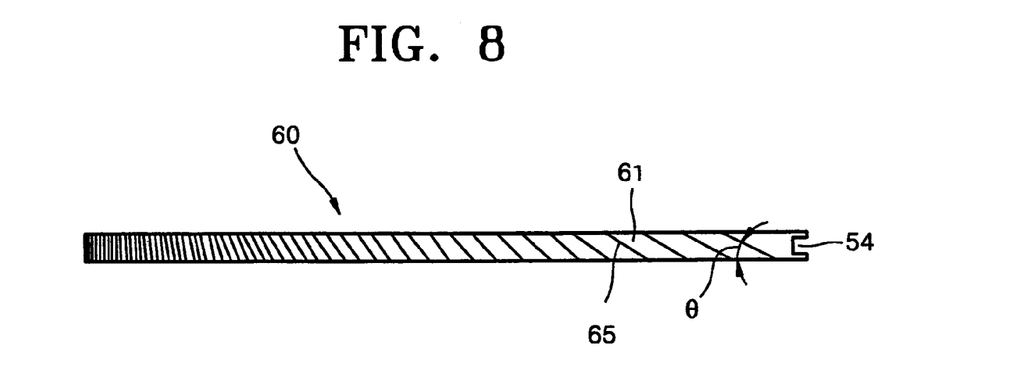
FIG. 8 is a bottom view showing an optical guide according to a first embodiment of the present invention.
Figure 9:
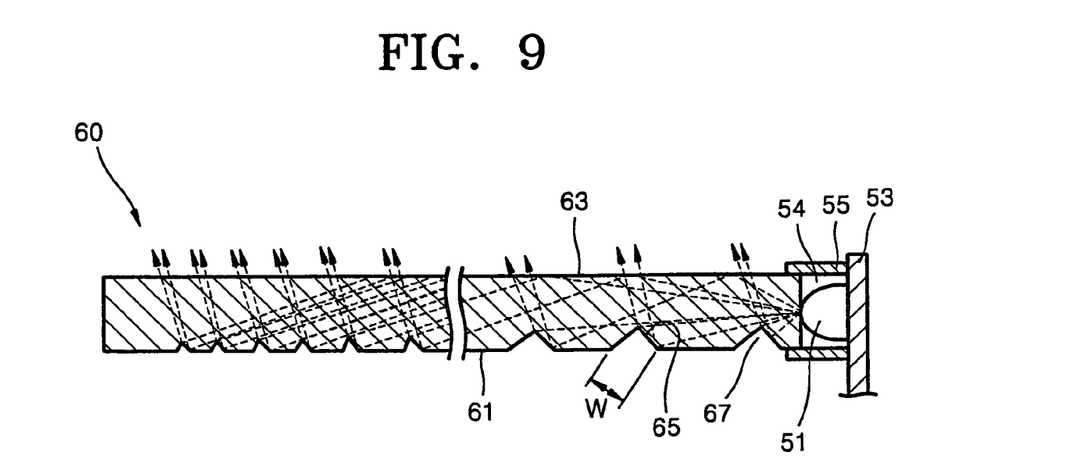
FIG. 9 is an enlarged front view showing the optical guide of FIG. 8.

FIG. 8 is a bottom view showing the optical guide 60 according to the first embodiment of the present invention, and FIG. 9 is an enlarged front view showing the optical guide 60 of FIG. 8. Referring to FIGS. 8 and 9, the optical guide 60 includes the first surface 61 having a plurality of reflective slopes 65 each having a stripe shape. Each reflective slope 65 forms a predetermined angle with respect to the lengthwise direction, is discretely formed, and the second surface 63 which is opposite to the first surface 61 and is used as an output surface from which light reflected from the reflective slopes 65 is output.

The reflective slopes 65 may be obtained by forming the stripe of a groove 67 having a triangular structure on the first surface 61, as shown in FIG. 9. In this case, the reflective slopes 65 form a surface toward which light is incident.

When moving closer to the side onto which light is incident from the LED 51 inside the optical guide 60, an optical power of light gradually becomes stronger, and when moving further from the side onto which light is incident, the optical power of light gradually becomes weaker. Thus, by considering an optical power difference according to a distance from the light source inside the optical guide 60, the plurality of reflective slopes 65 are formed to have reflectivity that gradually becomes lower when moving closer to the side onto which light is incident and gradually becomes greater when moving further from the side onto which light is incident. When the optical guide 60 is formed to have reflectivity that gradually becomes lower when moving closer to the light source and gradually becomes higher when moving further from the light source, the intensity distribution of light output in the effective width range of the optical guide 60 along the lengthwise direction can be uniform. Here, stripe-shaped light corresponding to the effective width of the lengthwise direction of the optical guide 60 is output from the optical guide 60, and the plurality of reflective slopes 65 are formed (as will be described later) such that the distribution of intensity of light output from the optical guide 60 can be uniform.

Figure 11:
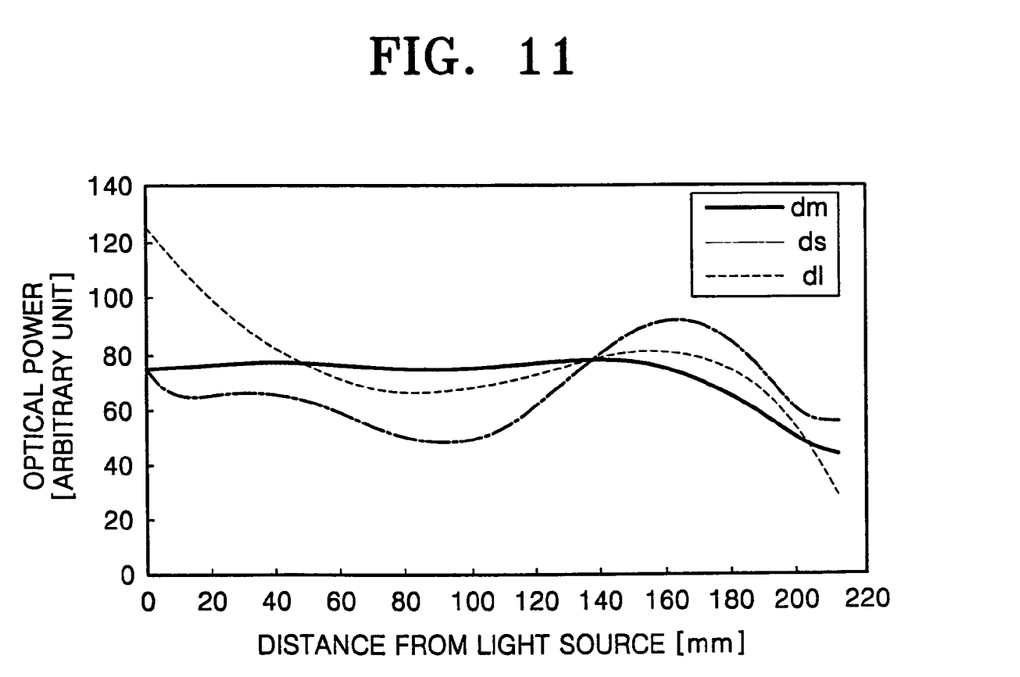
FIG. 11 is graph showing a variation in an optical power of light reflected from reflective slopes versus a distance from a light source when a width of reflective slopes has a small value ds, a middle value dm, and a large value dl.

In the first embodiment of the present invention, the plurality of reflective slopes 65 are formed so that an angle θ (gradient) formed with respect to the lengthwise direction varies. In particular, the reflective slopes 65 are formed so that the (angle θ) increases when moving further from the side onto which light is incident. In this case, as shown in the graph of FIG. 11, which will be described later, light incident into the optical guide 60 and traveling in the lengthwise direction is reflected by the reflective slopes 65 and the light having a uniform intensity distribution is output from the optical guide 60.

Here, the reflective slopes 65 are formed at an interval so that portions thereof can overlap one another when the slanted reflective slopes 65 are projected on an axis in the lengthwise direction.

Light irradiated on the surface of the photoreceptor drum 3 is slanted according to a variation in the gradient of the reflective slopes 65. However, due to the rotation of the photoreceptor drum 3, even though the interval between the reflective slopes 65 is large, only if the reflective slopes 65 are overlapped with one another as described above, can light be uniformly irradiated on the surface of the photoreceptor drum 3, and stripes do not occur on a print image.

In addition to a variation in the gradient of the reflective slopes 65, the reflective slopes 65 are formed to vary the interval therebetween, as shown in FIGS. 8 and 9.

In particular, the plurality of reflective slopes 65 are formed such that the interval therebetween gradually becomes narrower when moving further from the side onto which light is incident. Since each of the reflective slopes 65 acts as a reflector, as the interval between the reflective slopes 65 becomes narrower, the number of reflectors per unit area increases, and the reflectivity per unit area increases such that the distribution of intensity of light with respect to the lengthwise direction can be uniform.

Also, the reflective slopes 65 are formed to have a width w that gradually becomes greater when moving closer to the side onto which light is incident and gradually becomes smaller when moving further from the side onto which light is incident.

When the reflective slopes 65 are obtained by forming the groove 67 on the first surface 61 of the optical guide 60, the width w of each reflective slope 65 is an inclined surface of the groove 67 facing a direction where light is incident and corresponds to a depth of the groove 67.

Thus, a variation in the width w of each reflective slope 65 may be obtained by forming the groove 67 to be deeper when moving closer to the side onto which light is incident and to be shallower when moving further from the side onto which light is incident.

Figure 10:
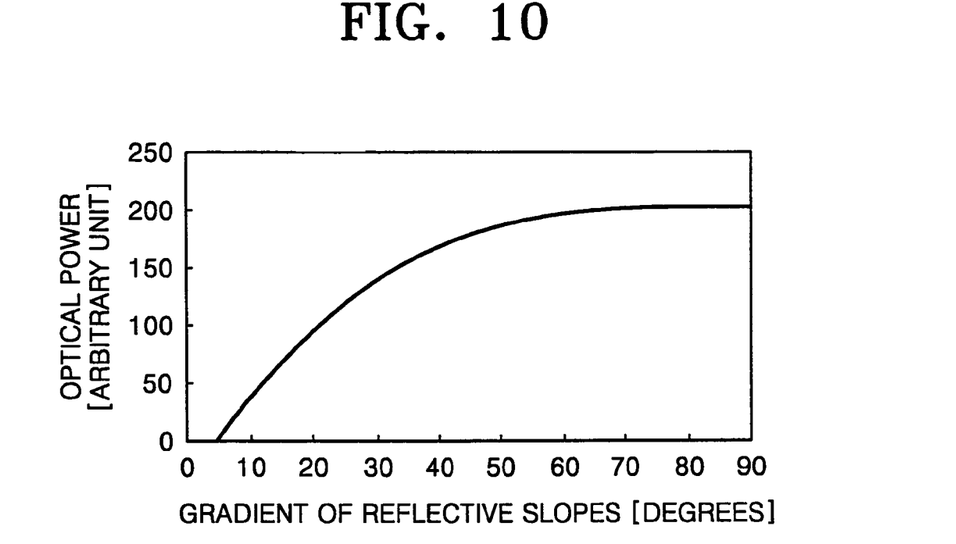
FIG. 10 is a graph showing an optical power of light reflected from reflective slopes according to a variation in the gradient of the reflective slopes.

FIG. 10 is a graph showing an optical power of light reflected from the reflective slopes 65 according to a variation in the gradient of the reflective slopes 65. The graph of FIG. 10 shows an optical power of light output according to a variation in the gradient of the reflective slopes 65 when an optical power of light incident onto each of the reflective slopes 65 having a different gradient is the same. The optical power of light corresponds to a variation in reflectivity according to the different gradients of the reflective slopes 65. Here, a horizontal axis of FIG. 10 represents the gradient of the reflective slopes 65 in the angle θ formed by the reflective slopes 65 with respect to the lengthwise direction.

As shown in FIG. 10, the optical power increases until the gradient of the reflective slope 65 increases to a predetermined angle, and then levels off.

That is, as shown in the graph of FIG. 10, as the gradient of the reflective slopes 65 becomes smaller, reflectivity is low, and as the gradient of the reflective slopes 65 becomes larger, reflectivity is high. Thus, considering that an internal optical power of the optical guide 60 gradually becomes stronger when moving closer to the light source, i.e., the LED 51, and gradually becomes weaker when moving further from the light source, if the gradient of the reflective slopes 65 is smaller when moving closer to the side onto which light is incident and to be larger when moving further from the side onto which light is incident as described above, when light that is incident into the optical guide 60 through one side and travels in the lengthwise direction is reflected by the reflective slopes 65 and output, the distribution of light intensity becomes uniform.

Thus, in the first embodiment of the present invention, when the gradient of the reflective slopes 65 is varied using a variation in the optical power of light according to a variation in the gradient of the reflective slopes 65, the distribution of intensity of light output from the optical guide 60 in the lengthwise direction can be uniform.

FIG. 11 is graph showing a variation in an optical power of light (i.e., the reflectivity of the reflective slopes 65) reflected from the reflective slopes 65 and output versus a distance from a light source when a width of the reflective slopes 65 (the depth of the groove 67) has a small value ds, a middle value dm, and a large value dl. As shown in FIG. 11, the output power of light according to the distance from the light source varies with the variation in the width w of the reflective slopes 65 (the depth of the groove 67). In particular, when moving further from the light source, the width w of the reflective slopes 65 gradually becomes smaller, and the output power of reflected light gradually becomes stronger.

As shown in FIG. 11, since the output power of light varies according to the distance from the light source and the width w of the reflective slopes 65, as described above, the distribution of amount of light can be more uniform by varying the width w of the reflective slopes 65 (i.e., the depth of the groove 67).

Figure 12:
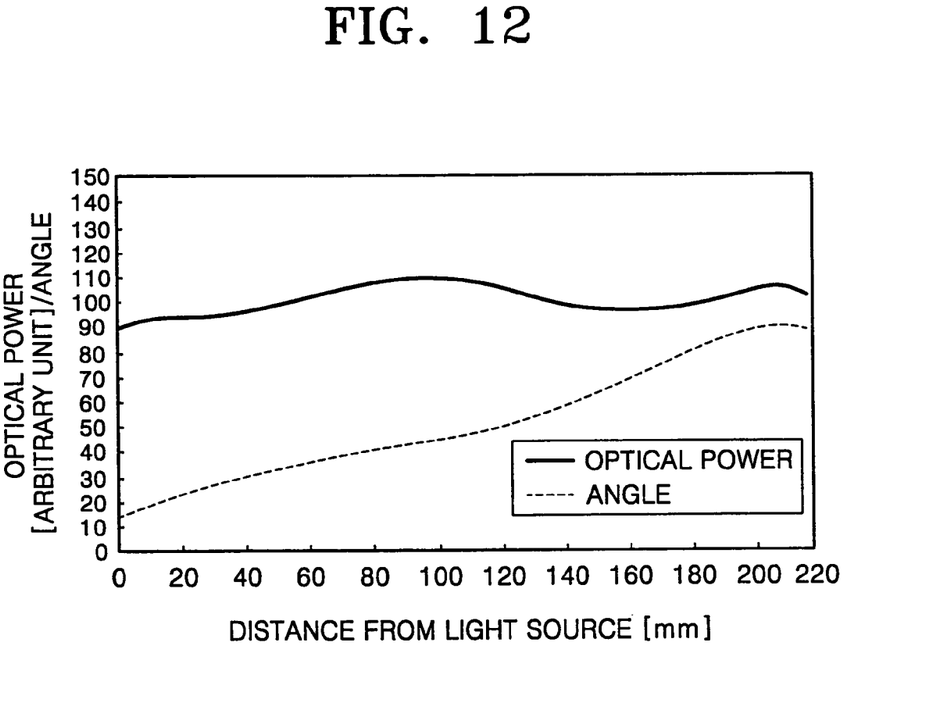
FIG. 12 is a graph comparing an optical power of light output from the optical guide according to a distance from a light source with a variation in the gradient of the reflective slopes when the gradient of the reflective slopes is formed to be larger when moving further from the light source, an interval therebetween is formed to be narrower when moving further from the light source, and the width of the reflective slopes is formed to be greater when moving closer to the light source and to be smaller when moving further from the light source.

FIG. 12 is a graph comparing an optical power of light output from the optical guide 60 according to a distance from a light source with a variation in the gradient of the reflective slopes 65 when the gradient of the reflective slopes 65 is larger when moving further from the light source, an interval between the reflective slopes 65 is varied as described previously, and the width w (the depth of the groove 67) of the reflective slopes 65 is varied right and left in the lengthwise direction of the optical guide 60 based on the result of FIG. 11. That is, the width w of the reflective slopes 65 is formed to be greater when moving closer to the light source and to be smaller when moving further from the light source. In FIG. 12, the optical power of light is an arbitrary unit.

As shown in FIG. 12, by the optical guide 60 according to the first embodiment of the present invention, output power of light having a uniform intensity distribution can be obtained.

The length of the optical guide 60 is about 220 mm in order to correspond to the width of A4 paper, and the distance from the light source in FIGS. 11 and 12 is within a range of 0-210 mm.

As in the first embodiment of the present invention, the plurality of reflective slopes 65 each having a stripe shape are formed on the first surface 61 of the optical guide 60 so that an angle formed with respect to the lengthwise direction gradually becomes larger when moving further from the side onto which light is incident. Also, the interval between the reflective slopes 65 gradually becomes narrower when moving further from the side onto which light is incident, or additionally, the width w of the reflective slopes 65 gradually becomes smaller when moving further from the side onto which light is incident. Light incident into the optical guide 60 through one side is guided in the lengthwise direction, reflected by the reflective slopes 65, and the intensity distribution of output light becomes uniform.

Figure 13:
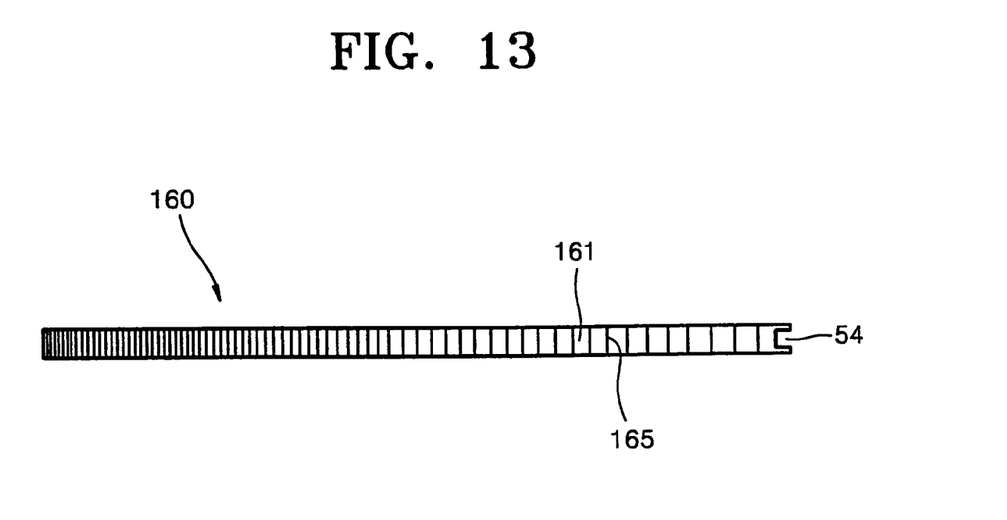
FIG. 13 is a bottom view showing an optical guide according to a second embodiment of the present invention.
Figure 14:
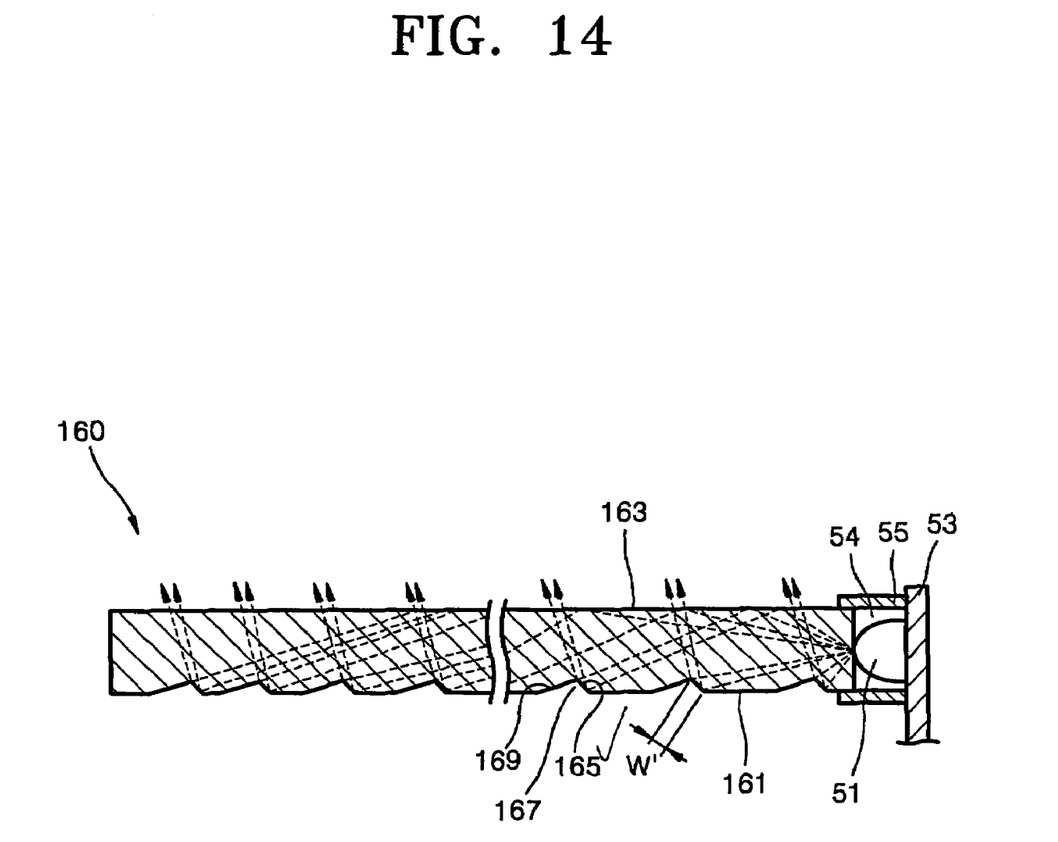
FIG. 14 is an enlarged front view showing the optical guide of FIG. 13.

FIG. 13 is a bottom view showing the optical guide 160 according to a second embodiment of the present invention, and FIG. 14 is an enlarged front view showing the optical guide 160 of FIG. 13. Referring to FIGS. 13 and 14, the optical guide 160, like the optical guide 60 according to the first embodiment, includes the first surface 161 on which a plurality of reflective slopes 165 each having a stripe shape forming a predetermined angle with respect to the lengthwise direction are discretely formed, and a second surface 163, which is opposite to the first surface 161 and is used as an output surface from which light reflected from the reflective slopes 165 is output. The plurality of reflective slopes 165 are discretely formed at the first surface 161 to vary an interval therebetween.

In this case, considering that an optical power of light gradually becomes stronger when moving closer to the light source in the inside of the optical guide 160 and gradually becomes weaker when moving further from the light source in the inside of the optical guide 160, the reflective slopes 165 in the second embodiment are formed so that the interval between the reflective slopes 165 gradually becomes wider when moving closer to the light source and gradually becomes narrower when moving further from the light source.

Also, the plurality of reflective slopes 165 are formed parallel to one another. For example, in the second embodiment, the plurality of reflective slopes 165 may be formed parallel to one another to be perpendicular to a lengthwise direction.

Also, the plurality of reflective slopes 165 are formed to have a uniform width w', as shown in FIG. 14. The reflective slopes 165 may be obtained by forming a groove 167 having a triangular structure on the first surface 161 to have a stripe shape, as in the optical guide 60 according to the first embodiment.

In this case, the width w' is small by forming the groove 167 with a small depth. Also, the groove 167 includes a slope 169 having a gentle incline with respect to the lengthwise direction and a width greater than the width w' of the reflective slope 165.

Here, as described above, if the slope 169 has a gentle incline, light incident into the optical guide 160 through one side can travel as far as possible. Thus, for example, it is easy to transmit light to an end of the optical guide 160 to correspond to the width of A4 paper. Here, even in the optical guide 60 according to the first embodiment, this portion, i.e., the slope, may be formed having a gentle incline, as in the second embodiment.

When a surface of the optical guide 60 or 160 according to the first and second embodiments of the present invention as described above is not a mirror surface but includes a rough portion, scattering occurs in the rough portion of the surface, and light leaks in the vicinity of the rough portion such that an optical power of light output from the optical guide 60 or 160 are reduced.

Thus, all surfaces of the optical guide 60 or 160 are treated to be mirror-like, light is totally reflected while traveling in the inside of the optical guide 60 or 160, reflected only by the reflective slopes 65 or 165 formed on the first surface 61 or 161, and output from the second surface 63 or 163.

In this way, if all surfaces of the transparent optical guide 60 or 160 are mirror-like, an optical loss of light can be reduced, the intensity of light can be highly maintained, and thus, light can be effectively used.

According to the auxiliary transfer device 50 using the optical guide 60 or 160 and one LED 51 as a lateral light emitting body, light can be made uniform by the optical guide 60 or 160 with respect to the lengthwise direction such that light having a uniform intensity can be irradiated on the surface of the photoreceptor drum 3 as a photoreceptor medium in a main scanning direction.

In the image forming apparatus having the auxiliary transfer device 50 including the optical guide 60 or 160 and the LED 51 as a lateral light emitting body, the auxiliary transfer device 50 is not turned on during a warming-up operation and/or a cleaning operation is performed without the paper 8. Also, the auxiliary transfer device 50 is turned on successively during a normal printing operation, a charging potential of the photoreceptor drum 3 is reduced by about half, and thus, a transfer operation is easily performed.

When the optical guide 60 or 160 described above is used for the image forming apparatus using the auxiliary transfer device 50, the operational principle in which the transfer of a toner image is easily performed, and a process of printing an image on the paper 8 can be inferred from the above descriptions with reference to FIG. 1. Thus, detailed descriptions of the operation of the image forming apparatus using the auxiliary transfer device 50 according to the embodiments of the present invention will be omitted.

Meanwhile, as described above, the optical guide 60 or 160 guides light incident from the lateral light emitting body in the lengthwise direction and makes the intensity of light in the lengthwise direction uniform such that light having a uniform intensity can be irradiated on the surface of a photoreceptor medium, i.e., the photoreceptor drum 3. Thus, if the optical guide 60 or 160 and the lateral light emitting body are used in the eraser 40, the eraser 40 can effectively initialize the surface potential of the photoreceptor medium, i.e., the photoreceptor drum 3.

The eraser 40 in which the optical guide 60 or 160 is used, is installed before the charger so as to initialize the surface potential of the photoreceptor medium, i.e., the photoreceptor drum 3. The eraser 40 has an optical structure similar to that of the auxiliary transfer device 50 in which the optical guide 60 or 160 is used. Thus, a description of the eraser 40 will be omitted.

Here, the optical guide 60 or 160 can be used for other optical systems requiring uniform output power of light with respect to the lengthwise direction of the optical guide 60 or 160.

As described above, the optical guides according to the embodiments of the present invention guide light incident through one side in a lengthwise direction and outputs light having a uniform intensity distribution in the lengthwise direction.

Thus, if the optical guide and a lateral light emitting body are used for an auxiliary transfer device, the auxiliary transfer device irradiates light having a uniform intensity on the surface of a photoreceptor medium on which a toner image is formed such that the concentration of a print image is uniform, printing quality is improved, and an image with high resolution can be formed.

In addition, if the optical guide and the lateral light emitting body are used for an eraser, the surface potential of the photoreceptor medium can be effectively initialized.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An image forming apparatus comprising an eraser which initializes a surface potential of a photoreceptor medium, and an auxiliary transfer device, which facilitates transfer of a toner image by radiating light on a surface of the photoreceptor medium,
   wherein the eraser and the auxiliary transfer device comprise:
      light source to emit light; and
      an optical guide on a side of the apparatus having the light source, which guides the light emitted from the light source and incident therethrough in a lengthwise direction of the optical guide, makes uniform the light in an effective width range of the lengthwise direction and outputs the uniform light,
   wherein the optical guide comprises:
      a first surface to receive the incident light, comprising a plurality of reflective slopes to reflect and make uniform the incident light, each having a stripe shape and a length forming a varying angle with respect to the lengthwise direction of the optical guide, and
      a second surface which is opposite to the first surface and is an output surface from which the light reflected from the reflective slopes is output, wherein the plurality of reflective slopes are formed so that an interval therebetween is varied and the interval between the reflective slopes gradually becomes smaller when moving further from a side onto which the light is incident.

2. An image forming apparatus comprising an eraser which initializes a surface potential of a photoreceptor medium, and an auxiliary transfer device, which facilitates transfer of a toner image by radiating light on a surface of the photoreceptor medium,
   wherein the eraser and the auxiliary transfer device each comprises:
      a light source to emit light;
      an optical guide on a side of the apparatus having the light source, which guides the light emitted from the light source and incident therethrough in a lengthwise direction of the optical guide, makes uniform the light in an effective width range of the lengthwise direction and outputs the uniform light,
   wherein the optical guide comprises:
      a first surface to receive the incident light, comprising a plurality of reflective slopes to reflect and make uniform the incident light, each having a stripe shape and a length forming a varying angle with respect to the lengthwise direction of the optical guide, and
      a second surface which is opposite to the first surface and is an output surface from which the light reflected from the reflective slopes is output;
   a groove on the first surface having a triangular structure and a stripe shape; and
   a slope which connects the reflective slopes to a portion of the first surface along the lengthwise direction and having a width greater than a width of the reflective slopes, which forms an incline with respect to the lengthwise direction,
   wherein the plurality of reflective slopes are parallel to one another and the plurality of reflective slopes have a uniform width.

* * * * *

UNITED STATES PATENT AND TRADEMARK OFFICE
CERTIFICATE OF CORRECTION

| | |
|---|---|
| PATENT NO. | : 7,347,611 B2 |
| APPLICATION NO. | : 10/629851 |
| DATED | : March 25, 2008 |
| INVENTOR(S) | : Tae-eun Kwon |

It is certified that error appears in the above-identified patent and that said Letters Patent is hereby corrected as shown below:

Column 11, Line 38, before "light source" insert --a--.

Signed and Sealed this

Twenty-sixth Day of August, 2008

JON W. DUDAS
*Director of the United States Patent and Trademark Office*